United States Patent [19]

Mahan

[11] Patent Number: 4,793,395

[45] Date of Patent: Dec. 27, 1988

[54] TIRE SHOCK ABSORBER

[76] Inventor: Donald E. Mahan, 2434 Phillips Rd., Forked River, N.J. 08731

[21] Appl. No.: 937,693

[22] Filed: Dec. 4, 1986

[51] Int. Cl.⁴ .................... B60B 9/02; B60C 23/00; B60C 29/00

[52] U.S. Cl. ............................ 152/8; 138/89.3; 138/89.4; 141/46; 152/337.1; 152/418; 152/428; 152/429; 152/DIG. 11; 188/314; 267/64.11

[58] Field of Search ............... 152/415, 418, 427–429, 152/DIG. 7, DIG. 11, DIG. 13, 333.1, 8, 10, 334.1, 337.1, 338.1, 341.1, 342.1; 137/513.3, 223, 513.5, 230, 513.7, 232, 533, 593, 855, 856; 141/46, 325, 326, 4; 138/89.3, 89.4; 73/707; 267/64, 11, 113, 136; 188/314; 301/5 VH

[56] References Cited

U.S. PATENT DOCUMENTS

| | | | |
|---|---|---|---|
| 1,134,701 | 4/1915 | Seeberger | 152/427 X |
| 2,872,962 | 2/1959 | Laurent | 152/10 |
| 3,236,278 | 2/1966 | Gaillard | 152/10 |
| 4,651,792 | 3/1987 | Taylor | 152/415 |

*Primary Examiner*—David Simmons
*Assistant Examiner*—Thomas Bokan
*Attorney, Agent, or Firm*—Clifford G. Frayne

[57] ABSTRACT

A tire shock absorber for attachment to a pneumatic tube tire or pneumatic tubeless tire for improving the smoothness of ride and decreasing road vibrations, the tire shock absorber comprising a chamber having at least one valve means which permits the unrestricted flow of air from the tubeless tire or tube tire into the chamber when the tire is subjected to intermittent road pressure, the valve means permitting the return of the displaced air to the tubeless tire or tube tire subsequent to the tire being subjected to the intermittent pressure. The tire shock absorber is designed for positioning either exterior to the tire or interior to the tire depending upon whether or not it is a tube tire or a tubeless tire.

4 Claims, 2 Drawing Sheets

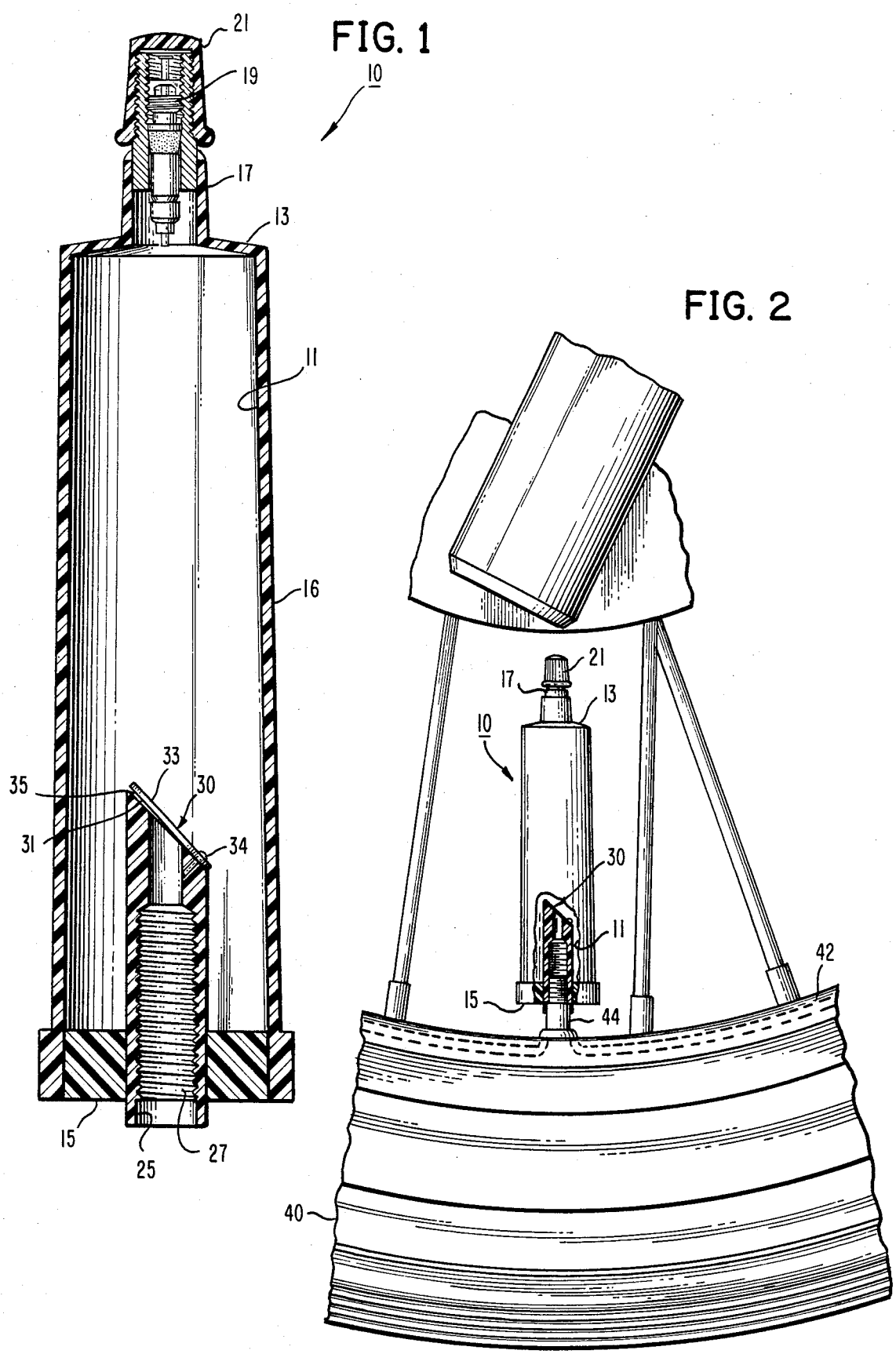

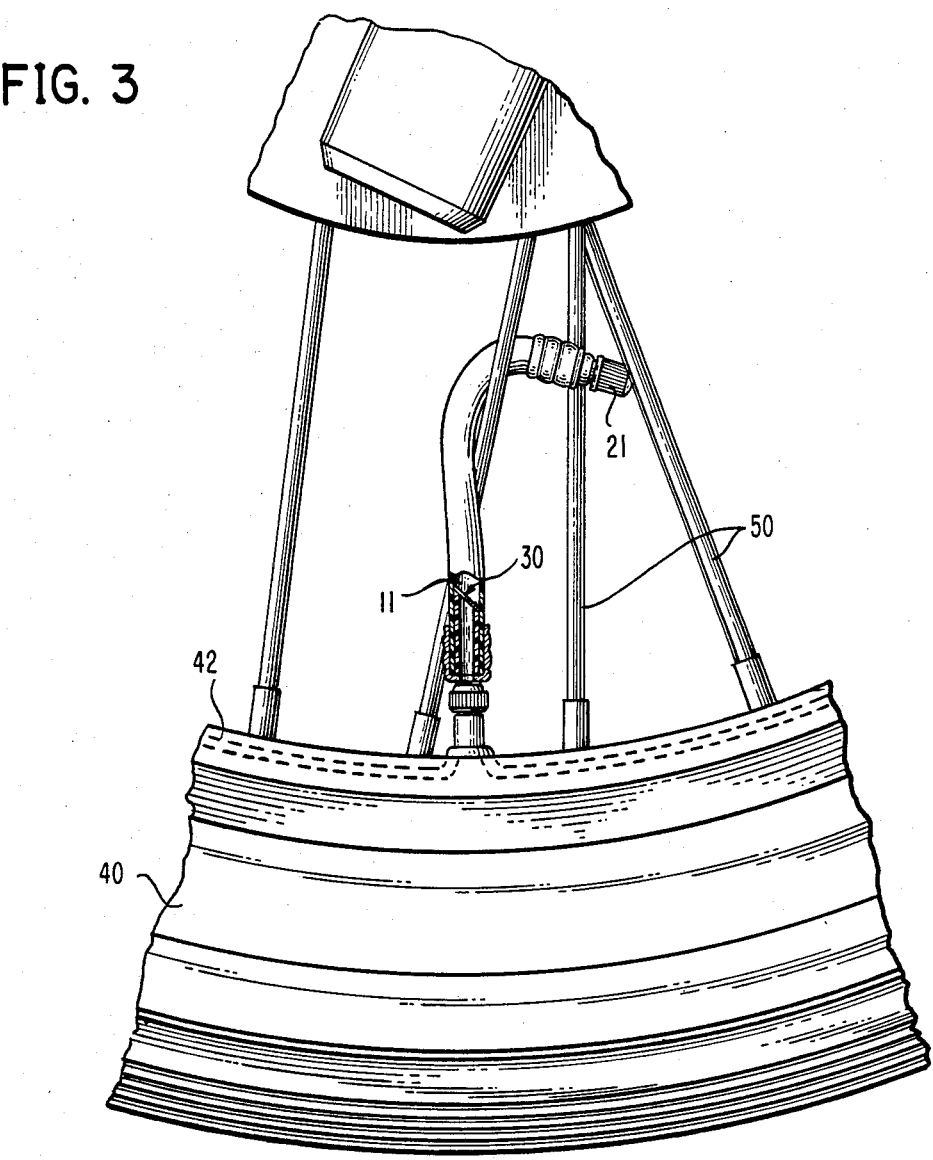
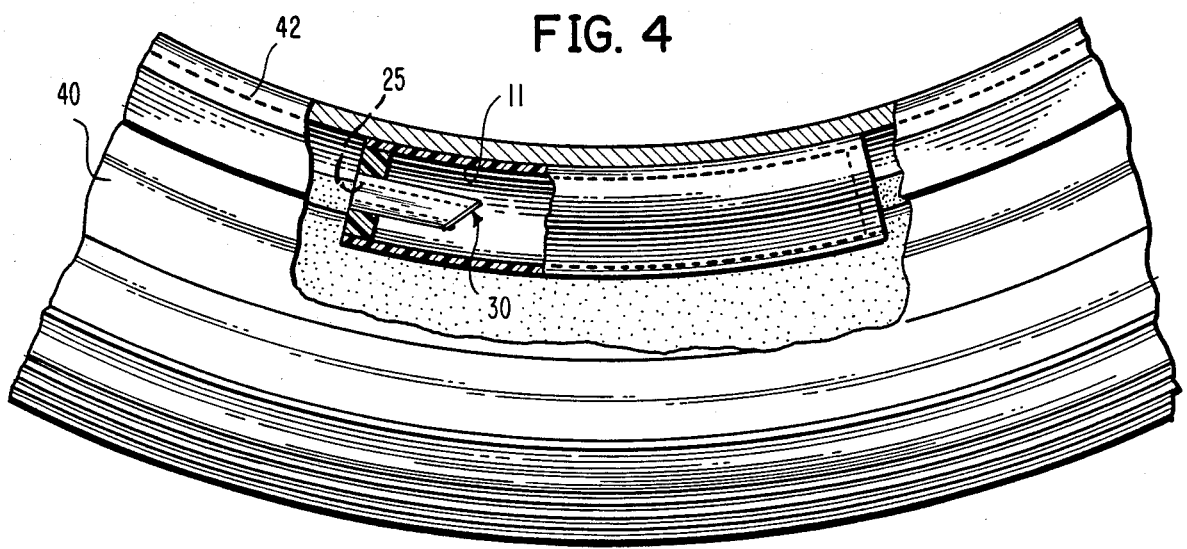

TIRE SHOCK ABSORBER

FIELD OF INVENTION

The present invention is directed to an improvement in tires and motor vehicle ride and, in particular, to a novel shock absorber for decreasing road vibration.

BACKGROUND OF THE INVENTION

A majority of vehicles, both power-driven and manually-operated, are supported by and ride on wheels which have pneumatic tires secured thereto. These pneumatic tires are filled with air to support the vehicle and rotate by means of a power train in motor propelled vehicles or by the manual operation of the operator such as a bicycle rider. On many of these vehicles, and in particular, power-driven vehicles, a shock absorber system is incorporated in the vehicle in order that the wheel may move in a vertical plane during operation to absorb undulations and irregularties in the surface upon which it is operated.

The standard shock absorber system is invaluable when the vehicle is being operated on a surface or in terrain which is very irregular or which requires the vehicle to encounter and circumvent the irregularities encountered by most drivers in the operation of the vehicle. These include curb cuts, potholes, and severe roadway irregularities.

The shock absorber system which is standardly incorporated in motor vehicles is also an integral part of the suspension system for the safe handling of the vehicle.

Indeed, the standard shock absorber system on a motor vehicle is primarily concerned with the handling of the vehicle when the vehicle is being operated on a relatively flat road surface. Nevertheless, such a road surface would include undulations which the shock absorber system is designed to smooth over.

The present invention is directed to an improvement in the shock absorber system with the present invention being directly related to the pneumatic tire of the motor vehicle. The present invention is directed toward those undulations or roadway irregularities which repeat themselves at regular intervals such as the seam between the concrete slab roadway portion found on many highways. These seams are not a significant irregularity such that the standard shock absorber system of the vehicle significantly reacts to the irregularity, however, particularly with motorcycles, these seams in the roadway do set up a repeated vibration which contributes to operator discomfort by repeatedly compressing the pneumatic tire of the vehicle as the vehicle passes over these seams.

Applicant's invention is related to a tire shock absorber which can react to these repeated irregularities which are not significantly dampened by the standard shock absorber system of the vehicle such that the tire shock absorber provides for a smoother vibration-free ride to the operator.

OBJECTS OF THE INVENTION

An object of the present invention is to provide a novel shock absorber for use with pneumatic tires.

Another object of the present invention is to provide a novel shock absorber which will react to subtle, repeated increases in pneumatic tire pressure.

Another object of the present invention is to provide for a novel tire shock absorber which is compatible with standard pneumatic tires, both tube and tubeless.

Still another object of the present invention is to provide for a novel tire shock absorber which will relieve subtle increases in pneumatic tire pressure yet prevent loss of air from the pneumatic tire and maintain desired pneumatic tire pressure.

SUMMARY OF THE INVENTION

These and other objects of the present invention are derived from a tire shock absorber comprising an enclosed chamber (secondary airspace) having a first inlet opening, the first inlet opening being threaded and containing a standard pneumatic tire valve, the enclosed chamber having a second threaded opening, the second threaded opening being designed to be removably secured to the standard pneumatic tire valve, the second threaded opening having positioned proximate thereto, and enclosed in the chamber, a valve means to permit air or gas in the pneumatic tire (primary airspace) to flow into the chamber when the pneumatic tire is subjected to subtle repeated increases in tire pressure, the valve means designed to permit the flow of gases from the chamber back to the pneumatic tire subsequent to the subtle increase in pneumatic tire pressure.

BRIEF DESCRIPTION OF THE DRAWINGS

A better understanding of the present invention as well as other objects and advantages thereof will become apparent upon consideration of the detailed disclosure thereof, especially when taken with the accompanying drawings wherein;

FIG. 1 is a side cutaway view of the tire shock absorber for a pneumatic tube tire.

FIG. 2 is a side elevational cutaway view of the tire shock absorber secured to a rim of a pneumatic tube tire.

FIG. 3 is a side elevational view of a second embodiment of the tire shock absorber secured to the rim of a pneumatic tube tire.

FIG. 4 is a side cutaway view of a third embodiment of the tire shock absorber secured to the interior rim of a tubeless tire.

DETAILED DESCRIPTION OF THE DRAWINGS

Referring to FIG. 1, there is shown a side cutaway view of a first embodiment of tire shock absorber 10. In this embodiment, the tire shock absorber 10 comprises an enclosed chamber 11 which is circular in cross sectional area and increases in cross sectional area from top 13 to bottom 15. The thickness of the walls 16 of chamber 11 would be dictated by the pressures being utilized in the tires to which it was attached. Protruding upwardly from top 13 of chamber 11 is a nipple 17 having contained therein, a standard pneumatic tire valve 19. Nipple 17 would be partially externally threaded for the removable receipt of cap 21.

Centrally located on bottom surface 15 of chamber 11 and protruding inwardly into chamber 11 is a cylindrical passageway 25. Cylindrical passageway 25 is internally threaded at its lower portion 27 in order to be removably secured to the nipple valve of a tire as will be more fully explained with respect to FIG. 2.

Cylindrical passageway 25 has secured at its topmost end, a valve means 30. In this embodiment, valve means 30 comprises a reed valve 31 which is in intermittent contact with reed stop 33 and reed cage 34. Reed valve 31 is designed to open when there is an increased pressure in the tire and to substantially close when that pressure is reduced. A slight gap between reed valve 31 and reed stop 33, as a result of a restrictor nipple 35 on reed 31 or reed cage 34, permits air in chamber 11 to bleed back into the tire, but at a slower rate or slower back flow than when the air is flowing from the tire into chamber 11.

Referring to FIG. 2, there is shown a side elevational cutaway view of the tire shock absorber 10 secured to a tire 40 which is similarly secured to a rim 42. The nipple 44 of tire 40, extends through rim 42 and the tire nipple valve has been removed. In this embodiment, the tire shock absorber is being shown with respect to a motorcycle tire. However, it can be secured in a similar fashion to the tire of an automobile.

In this configuration, the tire 40 could be pressurized whereby tire shock absorber 10 would be placed on nipple valve 44 of tire 40 and the entire tire pressurized through nipple valve 19 of tire shock absorber 10.

In operation, with the vehicle moving, if tire 40 were to encounter a slight irregularity in the roadway such as the seam between concrete slabs, this irregularity pressing on tire 40 would cause a slight increase in the tire pressure in tire 40. This pressure would activate reed valve 31 permitting this higher pressure to bleed off into chamber 11 of tire shock absorber 10. This increased pressure would be of extremely slight duration as the tire passes over the roadway irregularity. Once the tire 40 had passed over the irregularity, and the deformation of the tire had ceased, reed valve 31 would immediately close leaving only a slight gap for the air in chamber 11 to bleed back into tire 40 to return tire 40 to its normal tire pressure.

Through this configuration and operation, the slight roadway irregularities encountered by the operator are smoothed out by reallocating the tire pressure for a slight instant to permit the tire to roll over these irregularities.

It will be recognized by those skilled in the art that the shape of the chamber 11, is not critical to the invention as long as it does not interfere with the operation of the tire. The thrust of the invention is to provide a chamber to permit the compressed air or gases in the pneumatic tire to escape when the tire encounters increased pressure due to roadway irregularities and an elongate chamber appears best adapted to the purpose.

FIG. 3 is a second embodiment of the invention which reveals the thrust of the invention by providing a shock absorber 10 which is longitudinally cylindrical and particularly adapted to intertwine between he spokes 50 of a motorcycle tire. The second embodiment still provides the thrust of the invention by providing the chamber and valve means to permit the air from the pneumatic tire to enter into the chamber and to slowly bleed back into the pneumatic tire, but provides a more aerodynamic configuration.

Referring to FIG. 4, there is shown a third embodiment of the tire shock absorber having application to tubeless tires. In this configuration, the tire shock absorber can be secured within the tire 40 against rim 42. As shown in FIG. 4, chamber 11 is secured to the interior rim 42 and is completely enclosed by tubeless tire 40. The sidewalls of the chamber 11 would be of a rigid material; however, chamber 11 would have only one inwardly protruding passageway 25 for receipt of valve means 30. In this configuration, tubeless tire 40 would be filled by means of a normal valve nipple and chamber 11 enclosed within tire 40 would operate in a similar fashion by permitting air or gas in the tire to pass into chamber 11 when tire 40 is subjected to increased tire pressure as a result of road irregularities. The valve means 30 in chamber 11 would permit the air or gas to bleed back by means of a slow backflow into tire 40 once the road irregularity had passed.

While the above matter describes and illustrates the preferred embodiment of the invention, it should be understood that the invention is not restricted solely to the described embodiments, but that it covers all modifications which should be apparent to one skilled in the art which would fall within the scope and spirit of the invention.

I claim:

1. A tire shock absorber for direct screw-on attachment to the existing valve stem of a pneumatic tire, said pneumatic tire providing a primary airspace, said tire shock absorber for improving the smoothness of ride and decreasing the road vibration generated by the pneumatic tire and comprising:

a chamber defining a secondary airspace, in fluid communication with and removably securable to a valve stem of a pneumatic tire, exterior to said pneumatic tire, said valve stem of said pneumatic tire having its valve means removed;

a first valve means secured to said chamber, said first valve means comprising a tire valve to permit air to be introduced into said chamber and subsequently into said pneumatic tire for pressurizing said pneumatic tire;

a second valve means positioned in said chamber, disposed between said first valve means and said valve stem, said second valve means comprising a reed valve having a reed positioned between a reed cage and a reed stop, said reed valve opening to permit the passage of air from said pneumatic tire into said chamber when said pneumatic tire is subjected to intermitted pressure, said reed valve substantially closing upon release of said intermittent pressure to said pneumatic tire permitting the slow backflow of air or gas into said pneumatic tire from said chamber.

2. A tire shock absorber in accordance with claim 1 wherein said second valve means alternatively comprises a ball valve, said ball valve opening to permit the passage of air from said pneumatic tire when it is subjected to intermittent pressure, said ball valve substantially closing upon release of said intermittent pressure to said pneumatic tire permitting the slow backflow of air into said pneumatic tire from said chamber.

3. In combination a vehicle wheel having a rim supporting a pneumatic tire mounted on said rim, said pneumatic tire defining a primary airspace said pneumatic tire being inflated under gaseous pressure, a tire shock absorber in fluid communication with and secured in said pneumatic tire for improving the smoothness of ride and decreasing the road vibration generated by said pneumatic tire said combination comprising;

said tire shock absorber including a chamber, defining a secondary airspace, elongate in shape, having a first end and a second end, said chamber being closed at said second end, said chamber positioned in said pneumatic tire between an inner surface of said pneumatic tire and said tire rim;

a first valve means positioned within said chamber proximate to said first end, said first valve means comprising a reed valve having a reed positioned between a reed cage and a reed stop, said reed valve opening to permit the passage of air from said pneumatic tire into said chamber when said pneumatic tire is subjected to intermittent pressure, said reed valve substantially closing upon release of intermittent pressure through said pneumatic tire permitting the slow backflow of air or gas into said pneumatic tire from said chamber.

4. An apparatus in accordance with claim 3 wherein said chamber is mounted on said rim within said pneumatic tire.

* * * * *